(No Model.)  2 Sheets—Sheet 1.
G. SCHUHMANN.
CUT-OFF VALVE GEAR.
No. 321,538.  Patented July 7, 1885.
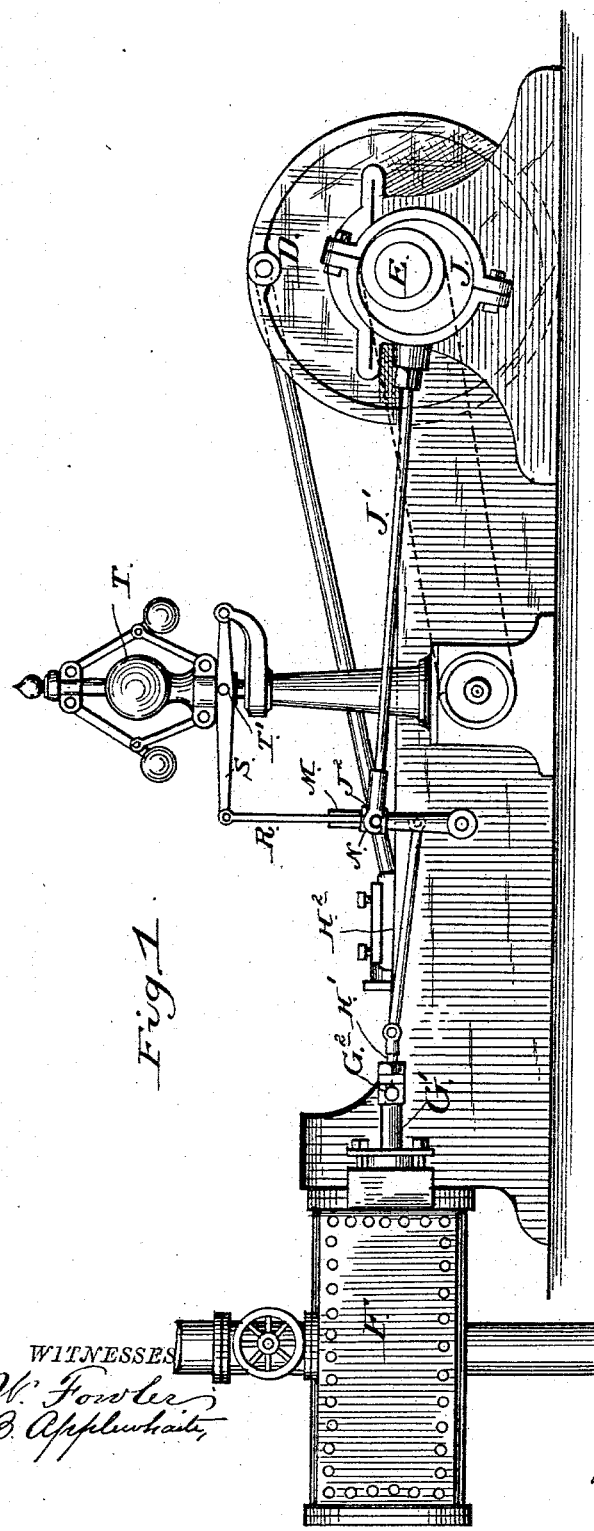
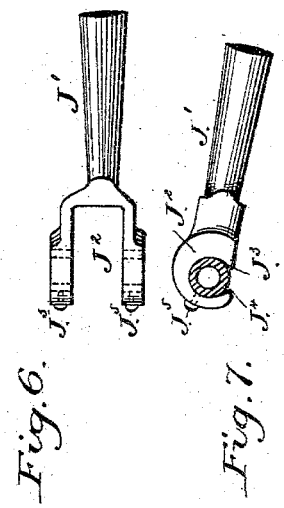
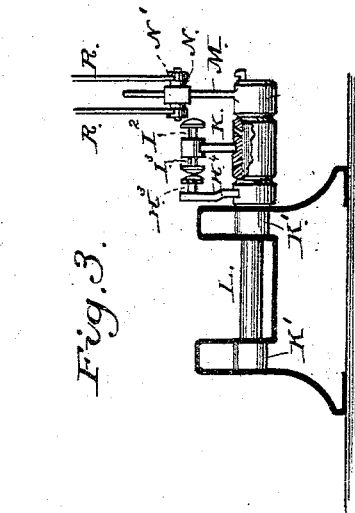
WITNESSES
T. W. Fowler
H. B. Applewhaite
INVENTOR
George Schuhmann
pr Thomas P. Kinsey
Attorney (No Model.) 2 Sheets—Sheet 2.
G. SCHUHMANN.
CUT-OFF VALVE GEAR.
No. 321,538. Patented July 7, 1885.
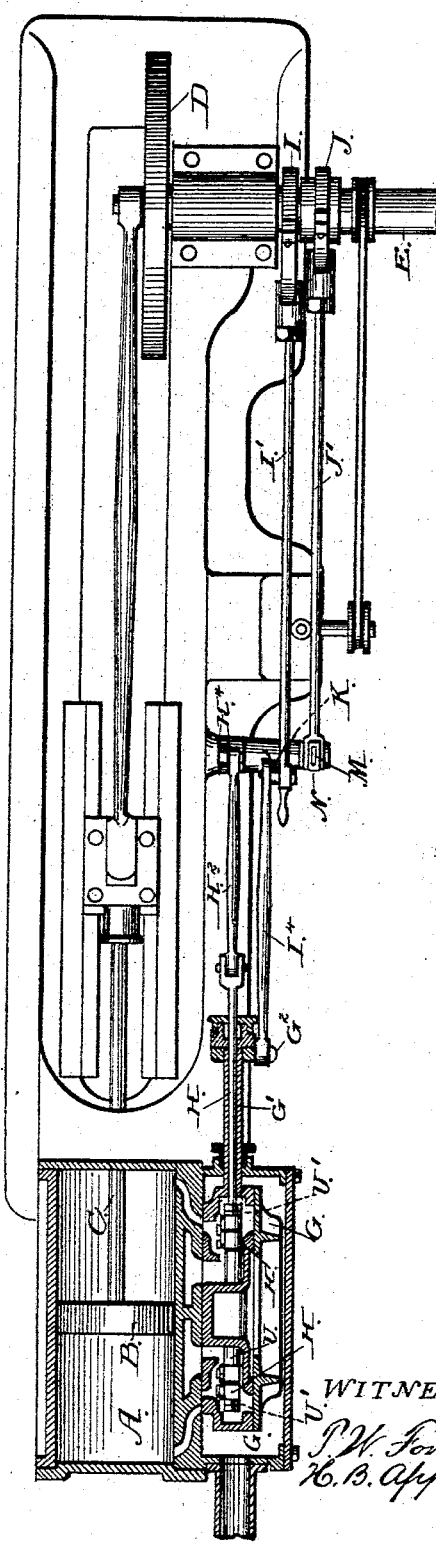
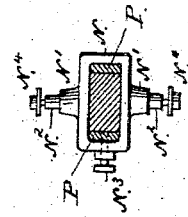
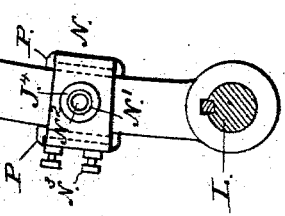
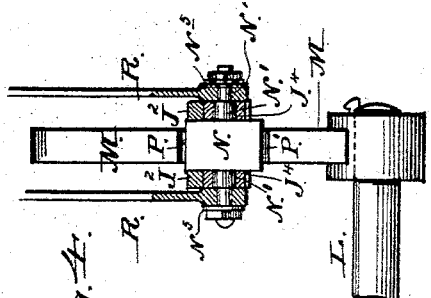
WITNESSES:
P. W. Fowler
H. B. Applewhaite
INVENTOR:
George Schuhmann.
p Thomas P. Kirsey
Attorney

UNITED STATES PATENT OFFICE.

GEORGE SCHUHMANN, OF READING, PENNSYLVANIA.

CUT-OFF-VALVE GEAR.

SPECIFICATION forming part of Letters Patent No. 321,538, dated July 7, 1885.

Application filed May 5, 1885. (No model.)

*To all whom it may concern:*

Be it known that I, GEORGE SCHUHMANN, a citizen of the United States, residing at the city of Reading, county of Berks, State of Pennsylvania, have invented a new and useful Improvement in Valve-Gear for Automatic Cut-Off-Valve Gear for Engines, of which the following is a specification.

This invention is more particularly related to riding cut-off valves, which may be operated in combination with a balanced or unbalanced long valve, or with an ordinary short D-slide.

The object of the invention is to produce in a simple, inexpensive, and effective manner a cut-off of a variable throw controlled by the governor of the engine, said cut-off valve positively adjusted relative to the main valve.

The drawings herewith, in which like parts are represented by similar reference-letters, fully set forth the improvement, in which—

Figure 1, Sheet 1, represents a side elevation of an engine with my improvement attached. Fig. 2, Sheet 2, is a top plan with the cylinder, steam-chest, and valves shown in section. Fig. 3, Sheet 1, is a transverse section of the bed-plate, taken just in front of the rock-shaft bearings. Fig. 4, Sheet 2, is a front elevation of the segmental arm, vibrating with and securely attached to the rock-shaft, showing the sliding box with its trunnions and governor-controlled suspension-links; Fig. 5, Sheet 2, a side elevation of the same arm; Fig. 6, Sheet 1, plan of the slide-box end of the eccentric-rod, and Fig. 7, Sheet 1, a side elevation of the same end of the rod; Fig. 8, Sheet 2, a top view of the sliding box with its trunnions, showing the segmental arm and brass gibs in section, in all of which—

A represents the cylinder, B the piston, C the piston-rod, D the crank, and E the crank-shaft of a stationary engine. F represents the steam-chest, within which is arranged the main valve G and the cut-off or riding valve H. The arrangement of the valves is similar to that shown in my patent of April 14, 1885, No. 315,844, and is given merely to show the adaptation of the improvement to a long D-valve, it being equally as effective applied to the ordinary short D-valve, the main feature of my invention consisting in the automatic operating of said valve H by a combination therewith of the segmental arm secured to the rock-shaft L.

The main valve G receives its fixed or positive motion from an eccentric, I, secured to the crank-shaft E, a rod, I', leading from said eccentric-strap to and detachably connected with a pin, I$^2$, of an arm, K, which is fitted to move loosely upon the rock shaft L. A pin, I$^3$, integral with pin I$^2$ in the arm K, connects with a rod, I$^4$, the opposite end of which is connected with the hollow or tubular stem G' of the main valve G by a pin, G$^2$, and thus a predetermined positive movement of the main valve is derived from the eccentric I.

The rock-shaft L has its bearings K' in the base of the bed-plate, and upon it, in addition to the segmental arm M and loose arm K, is secured, next to the bed-plate, an arm, H', provided with a pin, H$^2$. A rod, H$^2$, is connected at one end to the pin H$^3$, and at the opposite end by a pin-point of suitable form with the spindle H' of the riding or cut-off valve H, the spindle H' passing directly through the tubular stem G' of the main valve.

An eccentric, J, adapted to produce the desired travel of the riding-valve H, is secured to the crank-shaft in such position that a rod, J', connected with its straps shall connect by its bifurcated jaw J$^2$ with the trunnions N' of a sliding box, N, moving freely upon the segmental arm M. The jaws J$^2$, of the form shown in Figs. 6 and 7, are bored to receive bushes J$^4$—one in each. Subsequently an aperture, J$^3$, is cut through the lower face of the same, said aperture being of such length as to pass over the trunnions N'. Rods or suspension-links R connect the governor T by its usual bifurcated lever, S, with the outer trunnions, N$^2$, of the sliding box. The connection between the sliding box N and the jaws J$^2$ of the eccentric-rod J' is made by dropping the jaws over the inner trunnions, N'. The bushes J$^4$, bored to fit the trunnions, are then shoved over the same and within the bore of the jaws, thus locking the jaws upon the box. As an additional measure of security, set-screws J$^5$ are screwed into contact with the bushes, as shown, reserving my right in the above mode of connecting a bifurcated rod with trunnions for a future application.

The segmental arm M has within its movable box N gibs P, one of which is adapted to take up the wear upon the arm by set-screws N³. The suspension-rods R are secured in place upon the outer trunnions, N², either by a washer and nut upon a threaded extension of the same, as shown in Fig. 4, or by a washer and top bolt exterior to the trunnion ends, as shown in Fig. 8.

To experts who have traced the connection of the eccentric J and its rod J' with the sliding box N, the latter with the arm M and governor T and the rock-shaft L, its arm H⁴, pin H³, rod H², and spindle H', with the valves H, it will be evident that the expansion and contraction of the plane of rotation of the governor-balls will, through their usual link-connection with the sleeve T', raise and lower the free end of the lever S, and with it the links R, sliding box N, and eccentric-rod J', and as the latter is so moved upon the segmental arm the motion of the riding or cut-off valve will be modified, cutting off earlier or later with reference to the movement of the main valve and the duty required from the engine.

The extent of the reciprocating movement of the cut-off valve H will be varied, and the time of the movement in relation to the stroke of the engine reciprocally changed, as the position of the sliding box N upon the arm M is automatically regulated by the governor in obedience to the requirements of the load upon the same, inasmuch as the position of the eccentric-rod J' and strap of the eccentric J is changed as the slide is raised or lowered. Both the travel and advance of the cut-off valves H will thus be altered; in other words, the change in the operation of the cut-off valve by the automatic adjustment of the slide N upon the segmental arm will be equivalent to that which would be effected by shifting the position of the eccentric J circumferentially upon the crank-shaft. At the same time more or less throw will be given to the cut-off valve H by the same adjustment.

Having shown the construction, application, and advantages of my improvement, I desire to secure by Letters Patent the following claims:

1. The combination of a riding cut-off valve and main valve of a steam or other engine, connected by suitable rods with a rock-arm, its shaft, and a segmental arm also secured thereto, an automatically-adjustable sliding box upon said arm, connected with an eccentric upon the crank-shaft by a rod provided with a bifurcated jaw, and suspended in movable control from the governor by lever S and links R, as shown, described, and for the purpose set forth.

2. In combination, the segmental arm M, secured to the rock-shaft L, the slide N, its adjustable gibs P, screws N³, trunnions N' N², suspension-links R, rod J', jaws J², eccentric J, shaft E, governor T, and lever S, substantially as shown, and for the purpose specified.

GEORGE SCHUHMANN.

Witnesses:
JAMES R. KENNEY,
W. C. GUTZINGER.